(12) United States Patent
Deng et al.

(10) Patent No.: US 12,380,908 B2
(45) Date of Patent: Aug. 5, 2025

(54) DYNAMIC NOISE AND SPEECH REMOVAL

(71) Applicant: Zoom Video Communications, Inc., San Jose, CA (US)

(72) Inventors: Jiachuan Deng, Singapore (SG); Cheng-Lun Hu, Singapore (SG); Zhaofeng Jia, Saratoga, CA (US); Qiyong Liu, Singapore (SG); Qi Yang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 489 days.

(21) Appl. No.: 17/701,517

(22) Filed: Mar. 22, 2022

(65) Prior Publication Data

US 2023/0282225 A1    Sep. 7, 2023

(51) Int. Cl.
| | |
|---|---|
| *G10L 21/0232* | (2013.01) |
| *G06F 3/16* | (2006.01) |
| *G10L 21/034* | (2013.01) |
| *G10L 25/30* | (2013.01) |
| *G10L 25/51* | (2013.01) |
| *H04L 65/80* | (2022.01) |

(52) U.S. Cl.
CPC .......... *G10L 21/0232* (2013.01); *G06F 3/165* (2013.01); *G10L 21/034* (2013.01); *G10L 25/30* (2013.01); *G10L 25/51* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 8,265,292 B2 * | 9/2012 | Leichter | G10L 21/0208 381/71.8 |
| 9,516,485 B1 * | 12/2016 | Bowers | H04M 19/04 |
| 2006/0193476 A1 * | 8/2006 | Jin | H03G 3/34 381/56 |
| 2018/0033454 A1 * | 2/2018 | Hardek | G10L 25/84 |
| 2020/0075033 A1 * | 3/2020 | Hijazi | G06N 3/086 |
| 2022/0020387 A1 * | 1/2022 | Paquier | G06N 20/00 |
| 2022/0051652 A1 * | 2/2022 | Winsvold | G10K 11/17885 |
| 2022/0225034 A1 * | 7/2022 | Burns | H04R 25/456 |
| 2022/0318551 A1 * | 10/2022 | St. Amant | G06F 16/587 |
| 2022/0319528 A1 * | 10/2022 | Chakraborty | G10L 21/0232 |
| 2022/0360897 A1 * | 11/2022 | Lee | H04R 3/12 |
| 2022/0392478 A1 * | 12/2022 | Hijazi | G10L 21/0364 |
| 2023/0282225 A1 * | 9/2023 | Deng | H04L 65/765 704/200.1 |
| 2024/0087361 A1 * | 3/2024 | Wexler | G06V 20/50 |

* cited by examiner

*Primary Examiner* — Seong-Ah A Shin
(74) *Attorney, Agent, or Firm* — Kilpatrick Townsend & Stockton, LLP

(57) ABSTRACT

Online audio and video conference applications can utilize a noise removal module to eliminate unwanted audio from a participant's speech. A noise removal module can rely on differentiating between human speech versus other audio to filter out noise. However, in some conference environments, participant and non-participant human speech can be present. Artificial intelligence models can be trained to detect both noise and non-participant audio, based on a variety of factors. The models can label captured audio and various noise removal modules can filter noise based on the output of the models.

18 Claims, 8 Drawing Sheets

DYNAMIC NOISE AND SPEECH REMOVAL

CROSS-REFERENCE TO RELATED APPLICATIONS

This application claims the benefit of Chinese Application No. 202220469216.2 filed on Mar. 3, 2022, which is incorporated herein by reference in its entirety.

FIELD

This application relates to the field of audio, video conferencing and more particularly to the field of noise removal in an online audio, video conference.

SUMMARY

The appended claims may serve as a summary of this application.

DETAILED DESCRIPTION OF THE DRAWINGS

Figure 1:
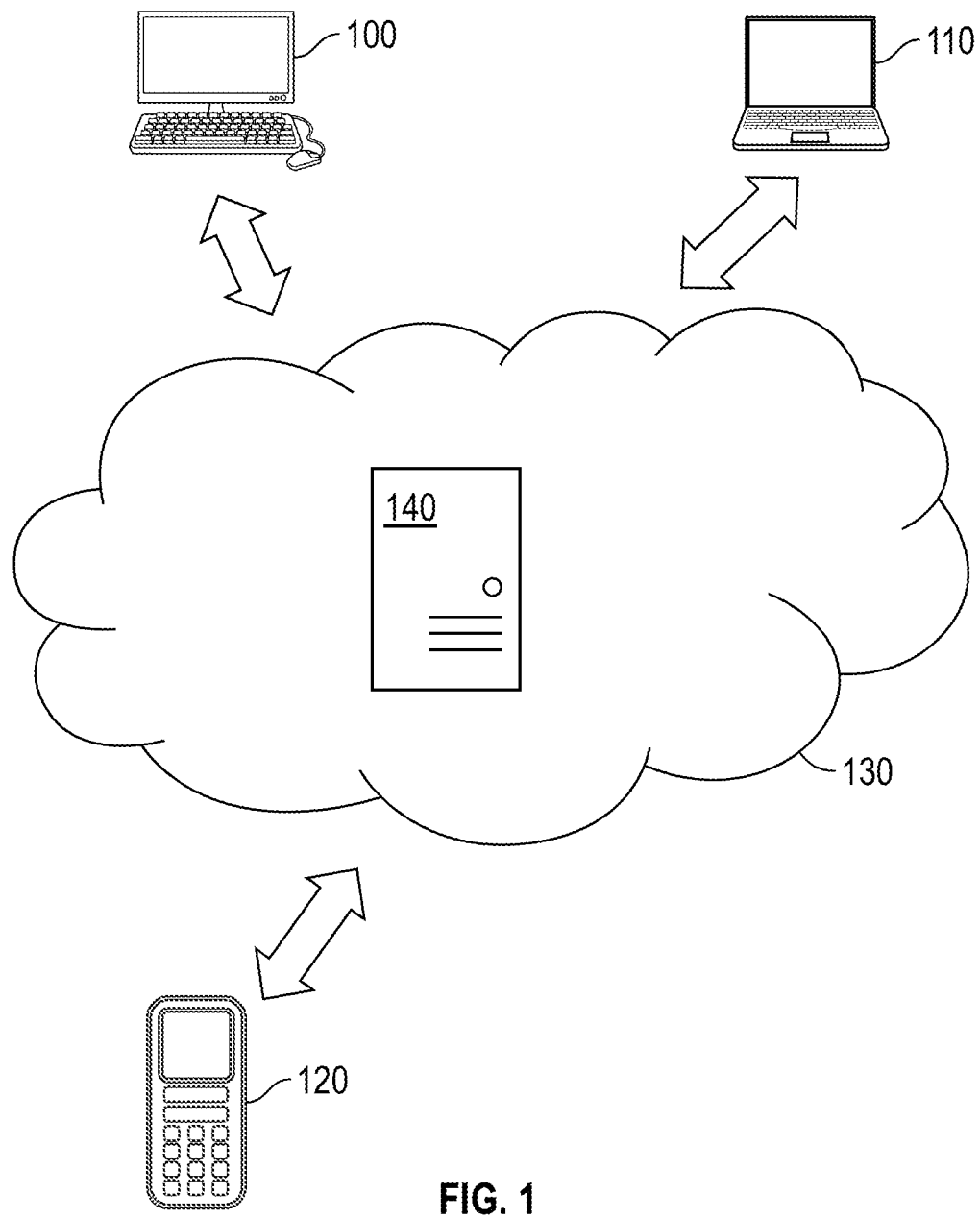
FIG. 1 illustrates a block diagram of a networked computer system within which an embodiment can be implemented.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Overview

Video conferencing over a computer network has existed and has increasingly played a significant role in the modern workplace. With the advent of remote working, the role of robust video conferencing systems has only become more critical. There are various components (local and remote) that work in unison to implement a video conferencing system. Typical video conferencing applications include a client-side application that can run on a desktop, laptop, smart phone or similar stationary or mobile computing device and can capture video and audio and transmit those to a recipient computer. Modern users also engage online video conferencing from a variety of locations, which may include audio in addition to the participant's voice. For example, a video conferencing participant may log into a video conference from home, using an audio/video capturing device. The audio captured by the device can include the participant's speech, as well as noise and background speech. Examples of noise include any non-speech audio, such as infant crying, moving fan, vehicle noise, coughing, clapping, doors opening and closing and many other examples. Robust noise canceling techniques can be deployed somewhere in the path of the captured audio to remove non-speech noise. These techniques can be more biased and sensitive to detecting and preserving speech audio. However, the audio captured by a video conferencing device of a participant can also include non-participant speech or background speech. For example, if a participant is conducting a video conference at home or in a crowded office, speech from other individuals in the vicinity of the audio capturing device of the participant can unintentionally be transmitted into the video conference. In these scenarios, dynamic noise canceling techniques can be used to remove both noise and background speech.

Example Environment of a Video Conferencing Application

FIG. 1 illustrates a networked computer system with which an embodiment may be implemented. In one approach, a server computer 140 is coupled to a network 130, which is also coupled to client computers 100, 110, 120. For purposes of illustrating a clear example, FIG. 1 shows a limited number of elements, but in practical embodiments there may be any number of the elements shown in FIG. 1. For example, the server computer 140 may represent an instance of a server computer running one or more application servers among a large plurality of instances of application servers in a data center, cloud computing environment, or other mass computing environment. There also may be hundreds, thousands or millions of client computers. In an embodiment, the server computer 140 hosts a video conferencing meeting, transmits and receives video, image, and audio data to and from each of the client computers 100, 110, 120.

Each of the client computers 100, 110, 120 can be a computing device having a central processing unit (CPU), graphics processing unit (GPU), one or more buses, memory organized as volatile and/or nonvolatile storage, one or more data input devices, I/O interfaces and output devices such as loudspeakers, headphones, headsets, and LINE-OUT jack and associated software drivers. Each of the client computers 100, 110, 120 may include an integrated or separate display unit such as a computer screen, touch screen, TV screen or other display. Client computers 100, 110, 120 may comprise any of mobile or stationary computers including desktop computers, laptops, netbooks, ultrabooks, tablet computers, smartphones, etc. The GPU and CPU can each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD), organic light emitting diode (OLED) or other display technology that serves as the display. In one embodiment, the network 130 is the Internet.

Each of the client computers 100, 110, 120 hosts, in an embodiment, a video conferencing application that allows each of the client computers 100, 110, 120 to communicate with the server computer 140. In an embodiment, the server computer 140 may maintain a plurality of user accounts, each associated with one of the client computers 100, 110, 120 and/or one or more users of the client computers.

Among other functions, the video conferencing application running on client computers can capture audio and transmit it to the server computer 140. The audio signal is generally captured having a variety of characteristics and parameters. The audio signal captured by the client device is converted into a digital audio signal, which can have a signal level. "Level" in an audio signal can be equivalent to an audio signal volume as perceived by a human. Digital signal level also relates to another characteristic of an audio signal called gain. Gain can refer to an amount of signal level added to or subtracted from an audio signal. Signal level, gain, and similar terminology, in this context can be expressed in units of decibel (dB). A related concept is dBov, or dBO, otherwise known as dB overload and can refer to a signal level or gain level, usually audio, that a device can handle before clipping occurs. The audio signal can also be characterized in terms of signal energy level. Typically, the closer a participant is to the audio capturing device of the client computers 100, 110, 120, the higher the energy level of the captured audio signal. A characteristic of background or non-participant speech is that their corresponding captured audio signal is at a lower energy level, compared to the participant's voice. As will be described, this dynamic can be used to detect and remove background speech. While the embodiments may be described in relation to a video conferencing environment, they are also applicable to an audio-conferencing environment or any other environment, where capturing audio of a speaker and removing unwanted speech and/or noise is desired.

Figure 2:
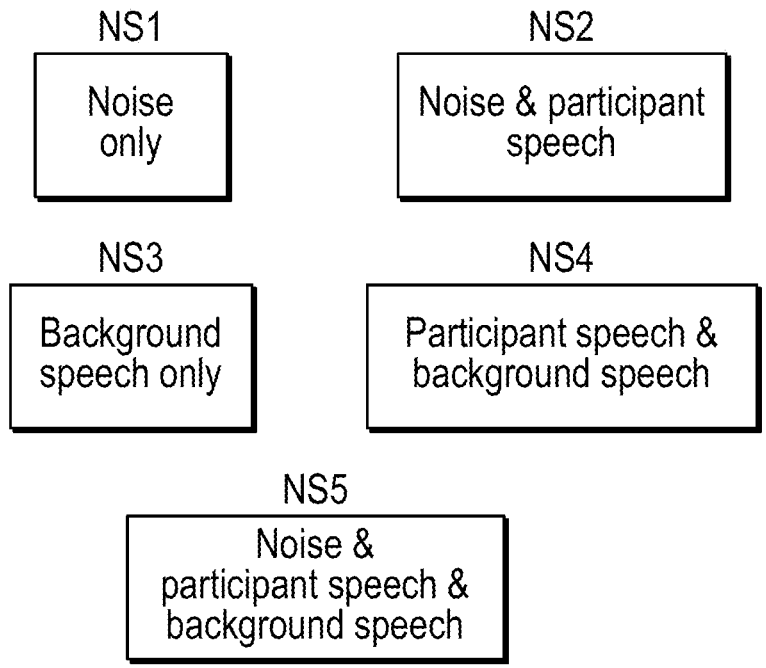
FIG. 2 illustrates a diagram of various noise scenarios that can occur in a video conferencing environment.

FIG. 2 illustrates a diagram of various noise scenarios that can occur in a video conferencing environment. In a first noise scenario (NS1), the captured audio includes only noise. NS1 can occur when the participant is silent, perhaps listening to other speakers in the meeting, and there is no other speech in the vicinity of the audio capturing device. Example noise in NS1 include the humming of a fan or air conditioning, tapping on the keyboard, mouse click, shuffling paper, coughing, sneezing, dog barking in the background and many other examples. In a second noise scenario (NS2), noise and participant speech may be present. NS2 can occur when, for example, the same participant as in NS1, begins speaking. The audio capturing device captures both the participant's speech and the environment noise. In a third noise scenario (NS3), the captured audio includes only the background or non-participant speech. NS3 can occur when, for example, the participant is silent, perhaps listening to other speakers in the conference, while a non-participant person in the vicinity of the audio capturing device is talking. In a fourth noise scenario (NS4), the captured audio can include both the participant's speech, as well as background speech. NS4 can occur when the participant is speaking in the video conference, while a non-participant person in the vicinity of the audio capturing device is also speaking. Finally, in a fifth noise scenario (NS5), the captured audio can include participant's speech, background speech and noise.

Figure 3:
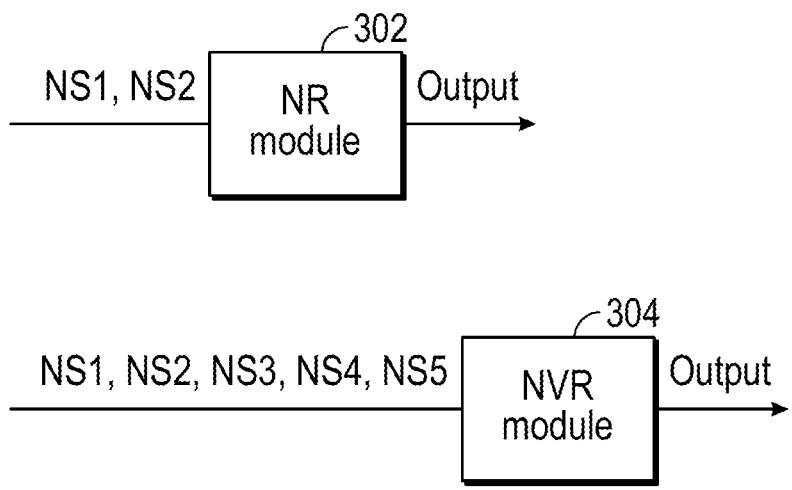
FIG. 3 illustrates a diagram of an example approach for handing the noise scenarios described in FIG. 2.

FIG. 3 illustrates a diagram of an example approach for handing the noise scenarios described above. The audio clips having NS1 and NS2 characteristics can be routed to a noise removal (NR) module 302. Since audio in NS1 and NS2 may contain at least some participant's speech, the NR module 302 can be configured to be more biased toward preserving speech rather than suppressing noise. For example, the NR module 302 may include an artificial intelligence (AI) model that labels portions of the captured audio as noise or speech. The model can be configured to be more sensitive in identifying speech portions, even if the increased sensitivity can increase the chances that the model may mislabel noise as speech. In other words, the NR module 302 is more geared toward identifying and removing noise and is less suitable for removing background speech that may occur in NS3-NS5.

The audio clips having NS1-NS5 characteristics can be routed to a noise and voice removal (NVR) module 304. The NVR module 304 can use a variety of techniques to identify and remove noise and background speech. For example, since background speech can have a lower energy level compared to the energy level of the participant's speech, one approach is to set audio energy level thresholds to filter out the low energy level audio signals. The NVR module 304 can also use an AI-based noise detector and a removal module, where the removal thresholds are learned by the AI model and are data driven. Both the NR and the NVR modules 302, 304 can include internal components. For example, in one embodiment, these modules can include a detector model, which labels portions of the captured audio as noise. The modules can also include noise removal modules that apply masks, gain tables or other audio processing techniques to suppress the portions of the audio that their detector has labeled as noise. These modules can also include a variety of other components, such as domain transfer components (e.g., time to frequency), segmentation components, speech level prediction components, and other components.

Audio signals in NS1-NS5 can also be captured in the context of online audio/video conferencing, where more than one participant is using the same device. For example, in a multiple-participant-same-device scenario, participants can be at varying distances from the audio capturing device. Consequently, an audio-energy-level-threshold approach (static and/or dynamic) can inadvertently remove the low-energy-level participant's speech. In other words, the NVR module 304 may apply noise suppression too aggressively, thereby inadvertently suppressing some participant's speech. In this and similar scenarios, a switching module can be used to switch an audio signal between the NR module 302 and the NVR module 304, depending on the noise scenario and the environment of the captured audio signal.

In some embodiments, the type of the audio capturing device that a participant is using can indicate whether a low-energy-level speech is due to a multiple-participant-same-device scenario or is due to background speech from non-participants. Similarly, the audio playback device a participant is using can be indicative of whether the conference is a single participant or multiple participants at a particular end-recipient location. For example, if the audio capturing device and the audio playback device are in the form of an integrated headset, the conference is likely not in an environment, where multiple participants are using the same device. A headset device includes on-ear, over-ear, or in-ear loudspeakers and integrated microphones. Therefore, if a participant is using a headset, the incoming audio from remote participants is likely only played back to the person wearing the headset. In this scenario, speech from other persons present in the vicinity of the microphone is likely background or non-participant's speech. Headset devices include any microphone, loudspeaker combination devices. The described embodiments are also applicable in scenarios where the participant is using a headphone and a separate microphone device, as opposed to a headset combination device. When the conference output is only audible by a single participant, the multiple-participants-same-device scenario is unlikely and background speech can be safely removed, using the NVR module 304.

Figure 4:
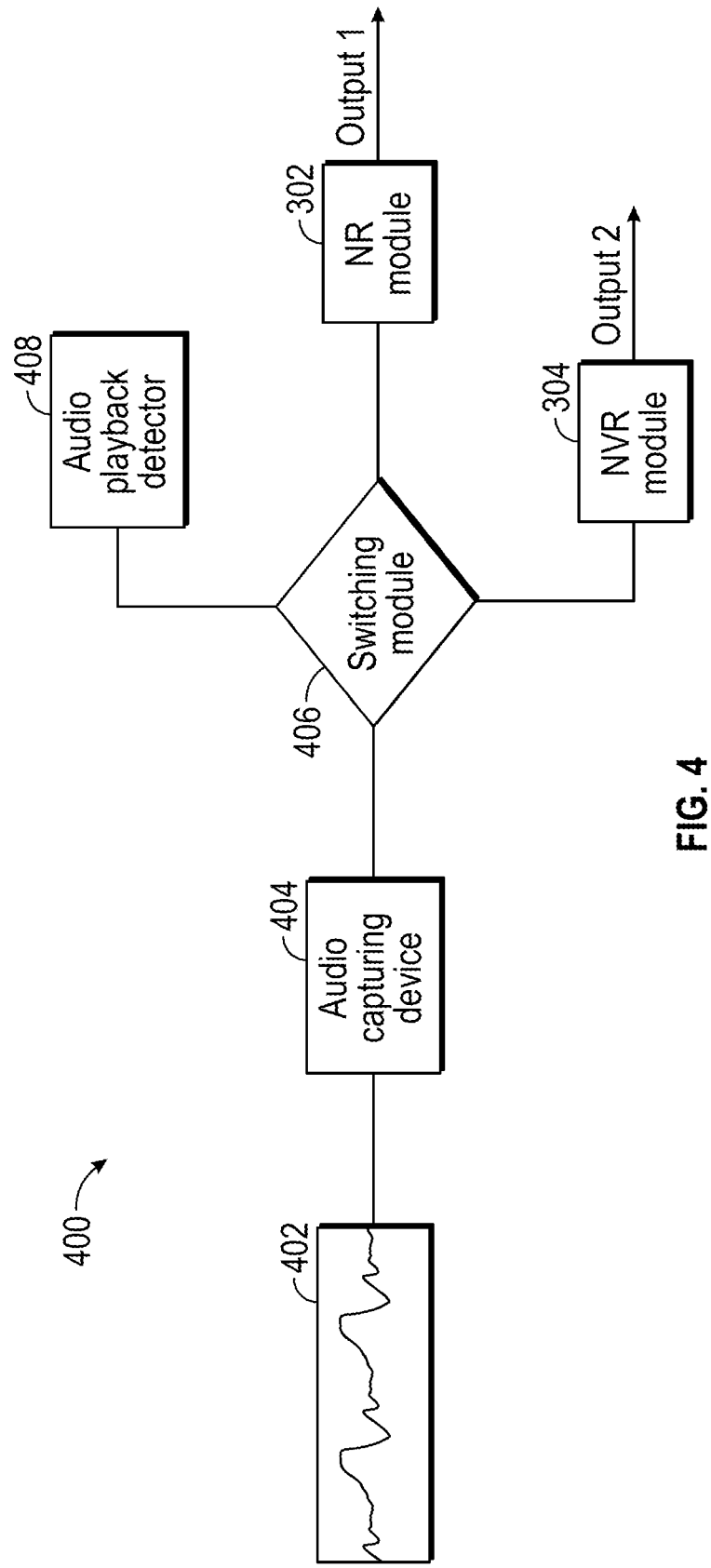
FIG. 4 illustrates a block diagram of an example noise removal system.

FIG. 4 illustrates a block diagram of an example noise removal system (NRS) 400.

Input audio 402 is captured by an audio capturing device 404. The audio capturing device 404 can be a stand-alone microphone, an integrated microphone in another device, a microphone in a headset, or any other kind of audio capturing device. The audio capturing device 404 can include a variety of hardware/software modules as part of a computing device a participant of an online conference may use to log into and conduct an online audio or video conference session. There may be a variety of other components before or after each component shown, for example, analog to digital converters (ADCs) and other components. The captured input audio by the audio capturing device 404 is routed by a switching module 406, depending on whether a single or multiple participants in a single location are using the same device to conduct the online conference.

In one embodiment, the switching module 406 can route the input audio 402 to the NR module 302 or to the NVR module 304, depending on the type of the audio playback device by which a participant is conducting the online conference. In scenarios where the audio playback device plays the audio of the online conference in an ear of a participant, the participant is likely the only participant in their end of the online conference, and the input audio 402 can be routed to the NVR module 304, where noise and background speech are suppressed. An example of this scenario is when the participant is using a headset, a headphone, earphone, or any over the ear and/or in the ear speaker-device for audio playback of the online conference.

In scenarios where the audio playback device does not play the incoming audio of the online conference in the ear of the participant, there may be additional participants in their end of the online conference, and the input audio 402 can be routed to the NR module 302, where noise is suppressed conservatively and with more deference to preserving speech, to prevent inadvertent removal of speech. An example of multiple participants in one location using a single device can occur when the audio playback device plays the audio of the online conference through a loudspeaker of a laptop, desktop, tablet, and/or other computing device with some distance from the ear of the participant, such that the audio playback can be audible by more than one individual in the location of the audio playback. Another example is when the incoming online conference audio is played back through a stand-alone, dedicated speaker or loudspeaker device. In other words, the scenario of multiple participants at one location using a single device, is more likely when the audio playback occurs in a way and through a device that more than one individual in the same location can hear the audio playback of the online conference.

The audio playback detector 408 can be implemented in a variety of ways. For example, the audio playback detector 408 can be implemented via a software module querying the operating system of the computing device of the participant for the active audio playback device, during the online conference. The operating system can include a text string of the name of the audio playback device. The text string can be searched for a selected library of keywords, such as "headset," "headphone," "earphone," and similar device names indicating a playback through an in-ear or over the ear device, such that only one individual is likely hearing the playback of the incoming audio of the online conference. In another embodiment, the audio playback detector 408 can include a library of headphone, headset and similar devices to match against the active audio playback device as reported by the operating system of the participant's online conference device. When a match is found, the switching module 406 can be accordingly signaled to route the input audio 402.

Figure 5:
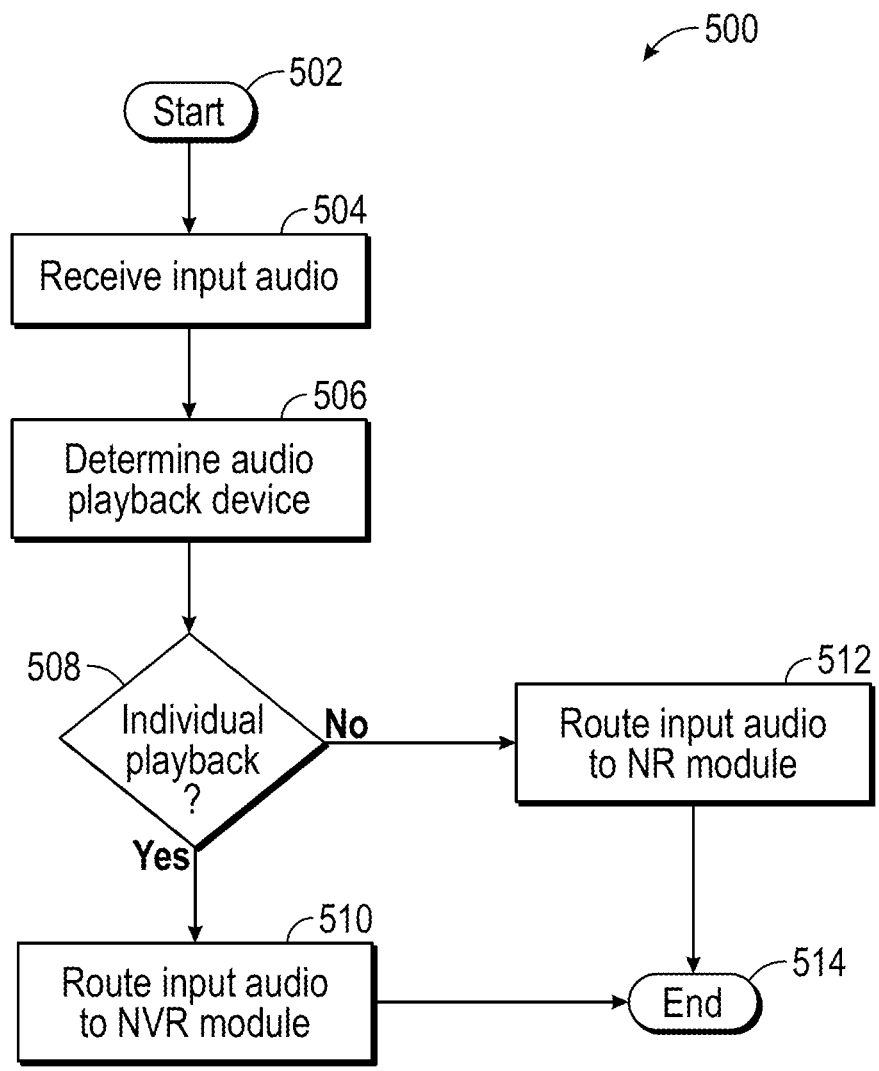
FIG. 5 illustrates a flowchart of a method of noise removal.

FIG. 5 illustrates a flowchart of a method 500 of noise removal. The method starts at step 502. At step 504, an input audio of a participant of an online conference is captured by an audio capturing device. At step 506, a type of audio playback device that the participant is using to conduct the online conference is determined. As discussed above, the determination can be through querying the operating system of the computing device the participant is using to conduct the online conference. At step 508, the captured input audio is routed based on the type of the audio playback device determined in step 506. If the audio playback device is of a type that likely only one individual can hear the audio playback, the method moves to the step 510, where the input audio is routed to a noise removal module, which is optimized for preserving speech when the NR module removes noise. An example of a noise removal module optimized for preserving speech while suppressing noise is the NR module 302. If the audio playback device is of a type that potentially more than one individual can hear the audio playback, the method moves to the step 512, where the input audio is routed to a noise and background speech removal module, which is optimized for removing both noise and background, non-participant speech. The method ends at step 514.

Building Artificial Intelligence Detectors

The NR and NVR modules 302, 304 can include AI-based detectors that label the undesirable portions of the input audio 402 to be suppressed by noise and/or background speech removal modules. In the case of NR 302, the internal noise removal module suppresses noise, while the internal noise removal module of the NVR 304 suppresses both noise and background speech. The internal noise removal modules may apply various audio processing techniques, such as masks, gain tables, and/or other techniques to the input audio 402, based on labels applied by the AI-based detectors. For example, in some embodiments, static or dynamic gain tables can be applied, where the participant speech portions of the input audio 402 are multiplied with a gain of near 1, so the participant portions of the input audio 402 remain unsuppressed. The noise and/or background speech portions of the input audio 402 can be suppressed by applying a gain of near zero to the labeled portions of the input audio 402.

The NR 302 detector can be an AI model trained to detect patterns of noise versus speech in an input audio signal 402. For example, various audio recordings containing a variety of noise, which may occur during an online conference can be used to train an AI model to detect noise versus human speech. A variety of AI models can be used. Examples include machine learning, deep learning, deep neural networks, convolutional neural networks, recurrent neural networks, and others.

The NVR 304 detector can be an AI model trained similar to the NR 302 detector, but with one or more additional training patterns. In some embodiments, the NVR 304 detector is trained to detect patterns of vagueness in speech, which can occur when a non-participant speech is captured by the audio capturing device 404 from a distance. The non-participant speech may be mumbled, muffled or otherwise vague. The NVR 304 detector can be trained to identify patterns of speech vagueness that can occur due to non-participant speech. In one embodiment, the training data for identifying speech vagueness can be generated by playing clean audio at various distances from a microphone device and recording the captured audio. In other words, playing audio clips at varying distances from a microphone can simulate non-participant or background speech. The generated recordings can be used as training samples containing speech vagueness. In this manner, the difficultly of quantifying speech vagueness can be avoided, as the NVR 304 AI detector can learn the patterns of speech vagueness from the audio clips generated from recording audio clips at varying distances of the recording microphone.

In another embodiment, the NVR 304 AI-based detector can be trained to identify patterns of low-level energy audio signal that can occur in the speech captured from a non-participant at a distance. To generate the training samples for identifying low energy level audio signals, the recorded samples from playing clean audio clips at varying distances from a recording microphone, can be modified via a software operation. The training samples of audio clips for identifying patterns of low energy level can be used to train the AI-based detector of the NVR 304 to detect and label the low energy level audio signals in the input audio 402. Training an AI-based detector enables the NVR 304 to not have to include preconfigured or dynamic thresholds for labeling the low energy level audio signals; instead, the AI detector identifies the low energy level audio signals based on patterns of such signals, learned from the training data, as opposed to applying fixed thresholds. In some embodiments, the AI detector of the NVR 304 can be trained to identify and label patterns of speech vagueness, low energy level audio signal and noise patterns.

Figure 6:
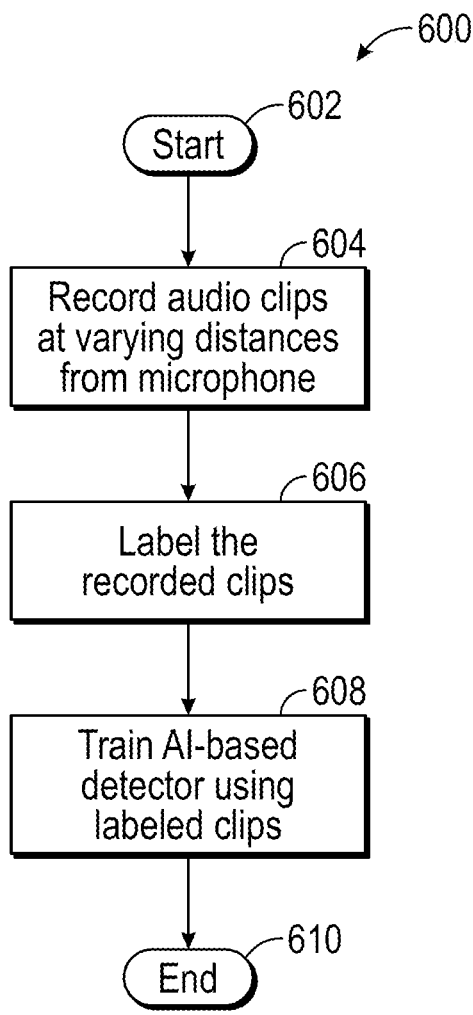
FIG. 6 illustrates a method of building an artificial intelligence detector for a noise and voice removal module.

FIG. 6 illustrates a method 600 of building an artificial intelligence detector for the NVR module 304. The method starts at step 602. At step 604, audio clips are played at varying distances from a recording microphone. At step 606, the recorded audio clips are labeled, indicating whether the audio clip contains participant speech, noise or background speech. At step 608, the labeled clips are used to train the AI-based detector of the NVR module 304. The training step can involve a variety of techniques, for example, varying the weights of the nodes of an artificial intelligence network, until an error function is minimized, and the artificial intelligence model is correctly labeling the audio clips with known labels. Other AI training techniques can also be used. The method ends at step 610. The trained AI-based detector can be deployed in the NVR module 304 and used to label various portions of the input audio 402 with noise, participant speech, and/or background speech, depending on the content of the input audio 402.

Figure 7:
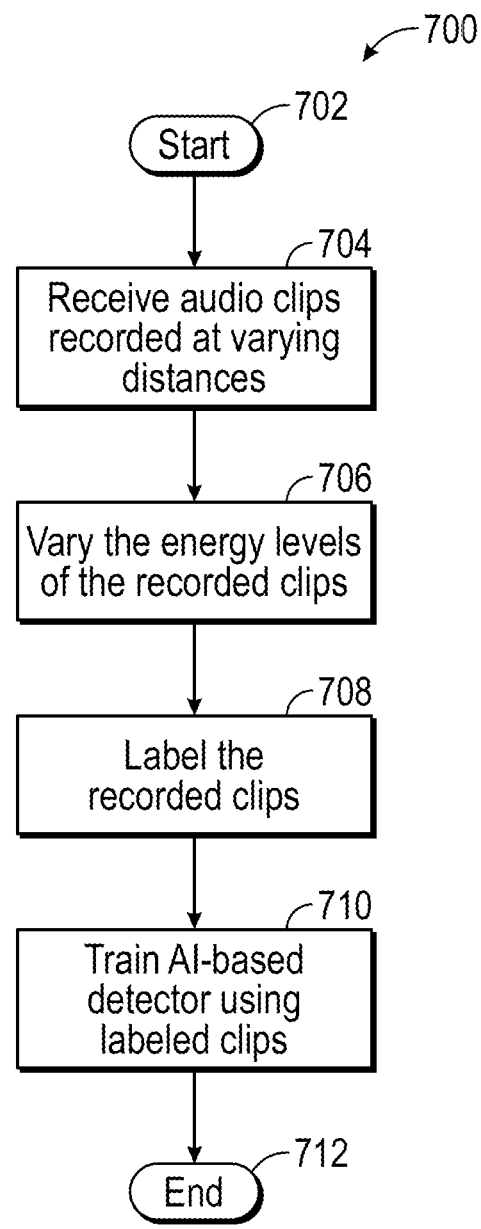
FIG. 7 illustrates an alternative method of building an artificial intelligence detector for the noise and voice removal module.

FIG. 7 illustrates a method 700 of building an artificial intelligence detector for the NVR module 304. The method starts at step 702. At step 704, audio clips that are recorded at varying distances from a recording microphone are received. At step 706, the recorded audio clips are used to generate a second group of audio recordings, whose energy levels are modified using software to simulate varying energy levels. At step 708, both the original audio clips and the modified audio clips are labeled, depending on their contents, such as noise, participant speech, and/or background speech. At step 710, the labeled audio clips are used to train the AI detector of the NVR module 304. Any AI training techniques can be used, including those described in relation to the embodiment of FIG. 6. The method 700 ends at step 712. The trained AI can be deployed in the NVR module 304 and used to identify noise, participant speech and/or background speech portions of the input audio 402.

Noise Removal Using Artificial Intelligence Detectors

Figure 8:
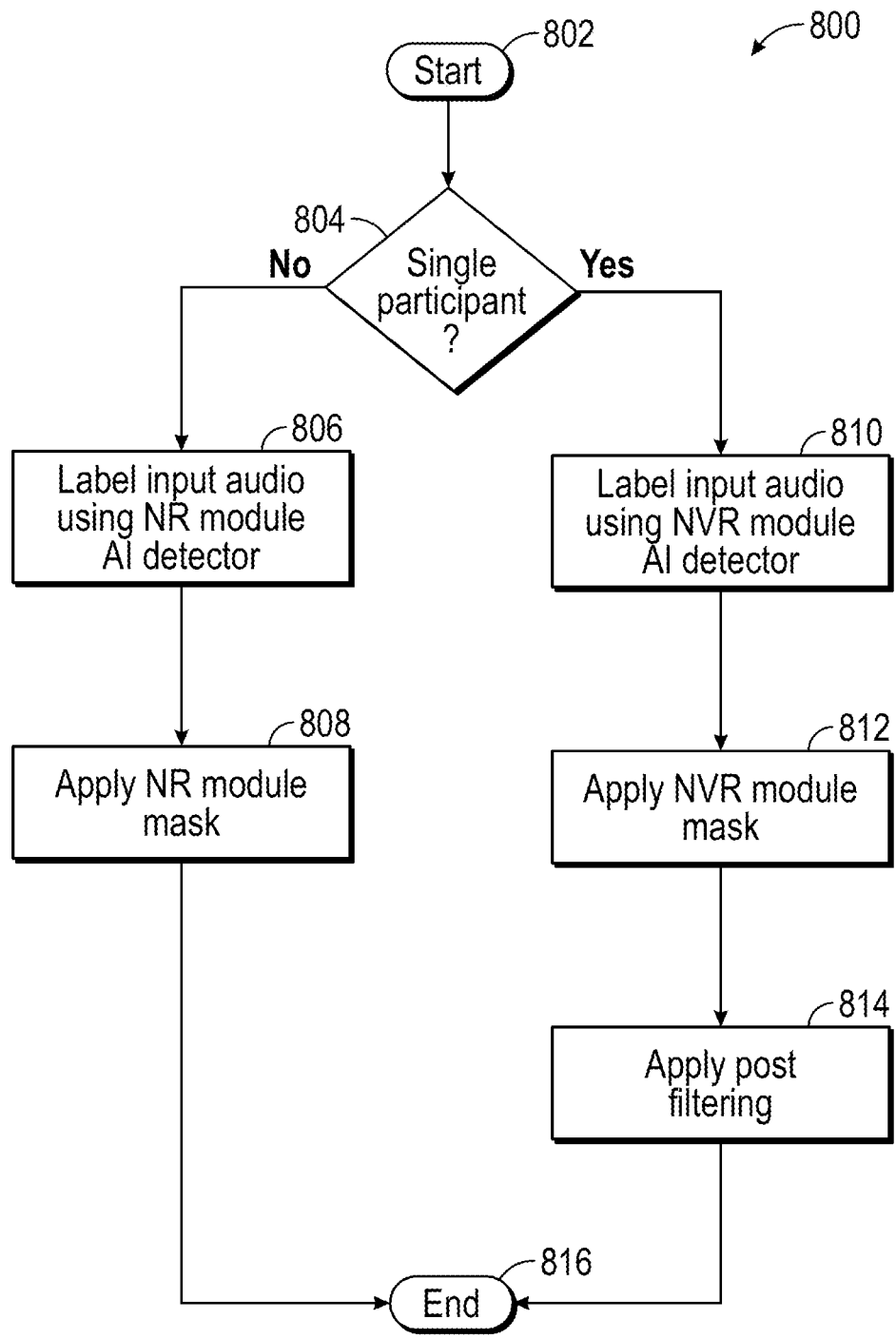
FIG. 8 illustrates a method of noise removal using trained artificial intelligence detectors.

The NR and NVR modules 302, 304 include artificial intelligence detectors as described above, as well as noise removal modules that use the labeling applied by the detectors to suppress the undesired portions of the input audio 402. FIG. 8 illustrates a method 800 of noise removal using trained artificial intelligence detectors. The method starts at step 802. At step 804, it is determined whether the input audio is received in an online conference where a single participant is generating the input audio, or if multiple participants in a location are generating the input audio. If the presence of multiple participants in the location is a possibility, the method moves to the step 806, where the trained AI detector of the NR module 302 labels the noise portions of the input audio. At step 808, the NR module 302 applies a mask to the input audio, based on the labels generated in step 806. The NR module mask removes the noise portions of the input audio, by for example, applying gains of near zero to the noise portions and gains of near one to the non-labeled portions of the input audio.

If at step 804, it is determined that more likely a single participant is the source of the input audio, the method moves to the step 810, where the trained AI detector of the NVR module 304 labels the noise and the background speech portions of the input audio. At step 812, the NVR module 304 applies a mask to the input audio, based on the labels generated in step 810. The NVR mask removes the noise and background speech portions of the input audio, by for example, applying gains of near zero to the noise and background speech portions and gains of near one to the non-labeled portions of the input audio. Compared to the NR mask applied in step 808, the NVR mask applied in step 812 can suppress noise more aggressively, for example by applying a higher amount of suppression gain and/or by applying suppression gain to more labeled portions of the input audio than would have occurred if the input audio signal was routed to the NR module 302.

In some embodiments, gain tables instead of or in addition to masks can be used in steps 808 and 812. In some embodiments, the output of the NVR module 302 can be routed to a post filtering module, where an adjusted gain table is applied to the output to further improve noise and background speech suppression. If post filtering is used, the method moves to step 814. The output of the post filtering step is routed to more upstream processing within the local and remote infrastructure of the online audio/video conference. The method ends at step 816.

Post Filtering

Figure 9:
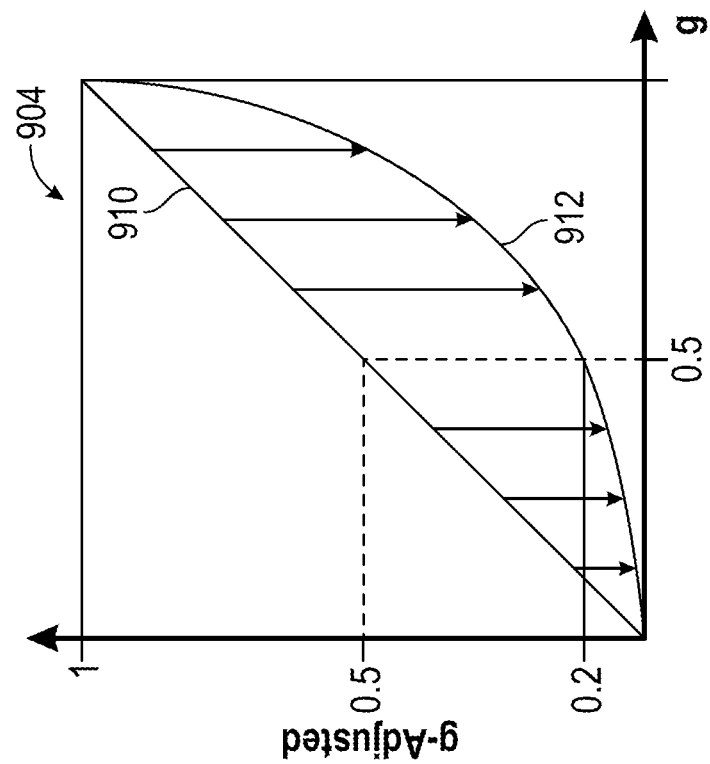
FIG. 9 illustrates graphs of applying noise suppression and post filtering.
Figure 9:
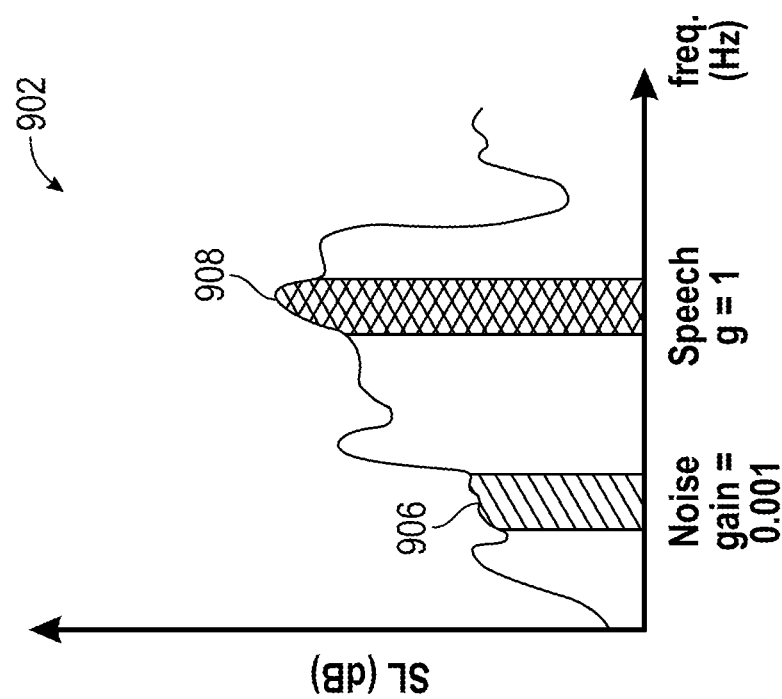

Post filtering can include generating a gain table based on a gain table applied to the input audio 402 by the NVR module 304. FIG. 9 illustrates graphs 902, 904 of applying suppression gains by the NVR module 304 and a post filtering module, respectively. In graph 902, signal level (SL) in dB versus frequency in Hertz (Hz) is plotted. Graph 902 can be a graph of the input audio 402 labeled by the NVR module 304. The input audio 402 in the section shown in graph 902 can be labeled in portion 906 to contain background speech or noise. In the portion 906, the NVR module 304 (or an internal noise removal module therein) applies a gain of near zero (e.g., 0.001) to the input audio 402. By contrast, in an unlabeled portion 908, the NVR module 304 applies a gain of approximately one, thereby not suppressing the input audio 402.

The graph 904 shows an example post filtering graph. A post filtering module can apply an adjusted gain to the output of the NVR module 304. The adjusted gain table can be based on the gains applied by the NVR module 304. The graph 904 illustrates on the Y-axis, adjusted gain values, "g_adjusted," and the gain values, "g," applied by the NVR module 304 on the X-axis. The curve 910 illustrates a scenario where no gain adjustment is performed (g_Adjusted=g). In some embodiments, the g_Adjusted can include lowering gain values for gains between near zero to near one, on a quadratic plot 912 as shown. In other embodiments, the gain adjustment can include more aggressively lowering the gain values for the gains applied to noise and background portions of the input audio 402, and less-aggressively lowering the gain values for other portions of the input audio 402. The precise shape of the plot of g_Adjusted 912 can be determined empirically, to optimize the post filtering module for filtering out noise and background speech. The g_Adjusted gain table values can be then deployed in a noise removal system by adding a post filtering module to the output of the NVR module 304.

Example Implementation Mechanism-Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
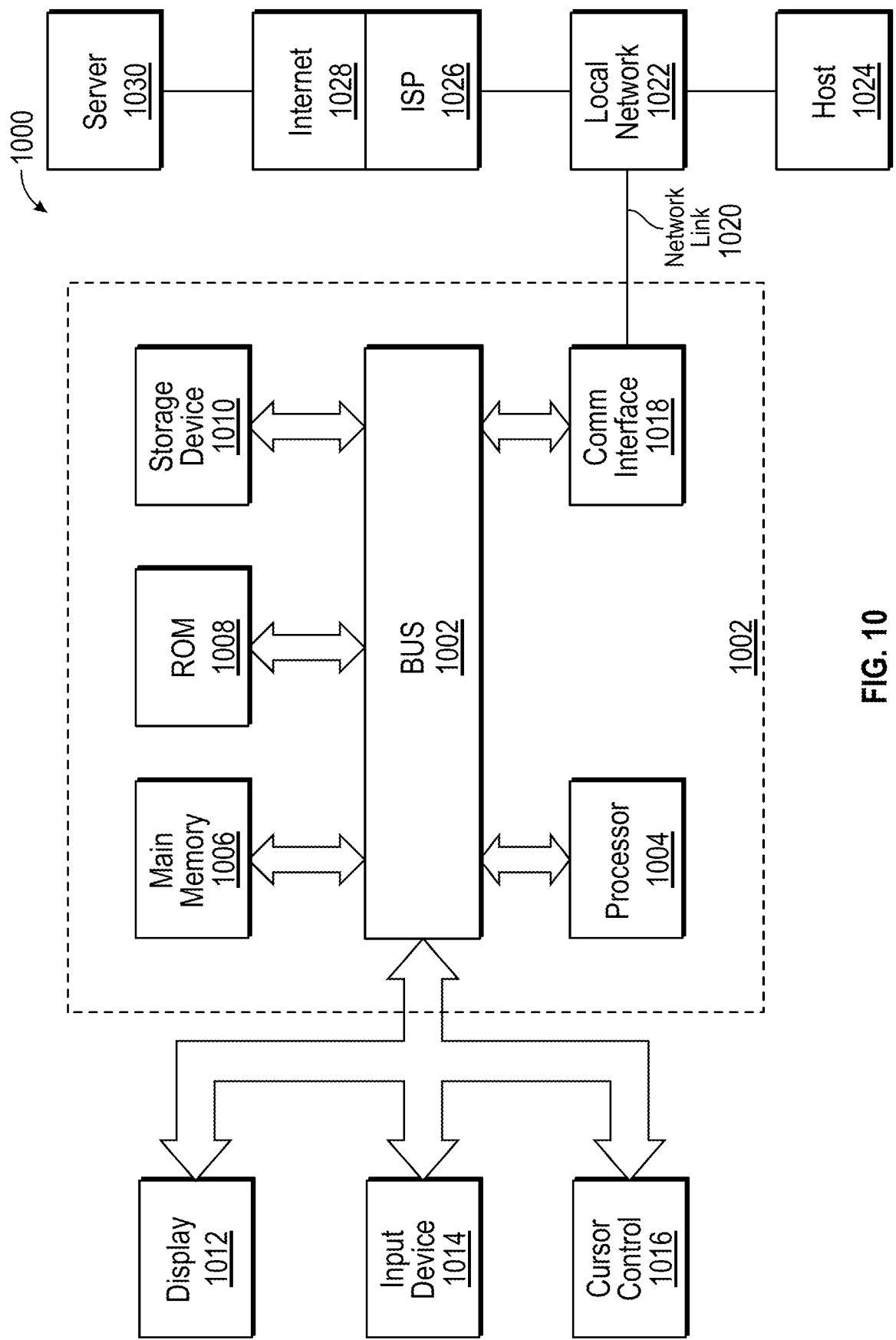
FIG. 10 is a block diagram that illustrates a computer system upon which one or more described embodiment can be implemented.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
receiving an input audio from an audio capturing device, the input audio comprising
speech from a participant of an online conference;
determining a type of audio playback device of the online conference; and
routing the received input audio to a first or second noise removal module, based on the determined type of the audio playback device, wherein:
the first noise removal module is configured to remove noise, the first noise removal module including a first artificial intelligence model trained to detect noise portions of the input audio; and
the second noise removal module is configured to remove noise and background speech, the second noise removal module including a second artificial intelligence model trained to detect noise portions of the input audio and background speech portions of the input audio.

2. The method of claim 1,
wherein when the audio playback device is of a type playing the online conference audio in an ear of the participant of the online conference, the input audio is routed to the second noise removal module, and
wherein when the audio playback device is of a type not playing the online conference audio in the ear of the participant, the input audio is routed to the first noise removal module.

3. The method of claim 1,
wherein the first noise removal module comprises a first artificial intelligence-based noise detector, trained to label noise portions of the input audio and wherein removing noise by the first noise removal module comprises applying a first mask to the input audio, suppressing portions of the input audio labeled by the first noise removal module, and
wherein the second noise removal module comprises a second artificial intelligence-based noise detector, trained to label noise and background speech portions of the input audio and wherein removing noise and background speech by the second noise removal module comprises applying a second mask to the input audio, suppressing portions of the input audio labeled by the second noise removal module.

4. The method of claim 1, wherein removing noise and background speech by the second noise removal module comprises:
labeling portions of the input audio comprising noise and background speech; and applying a first gain table to the input audio, based on the labeling, wherein the first gain table suppresses the noise and background speech portions of the input audio, wherein the method further comprises:
generating an output audio by the second noise removal module;
generating a second gain table, wherein the second gain table values are adjusted gain values based on the first gain table values, wherein the adjustment comprises lowering gain values in the second gain table relative to the gain values in the first gain table for the noise and background speech portions of the output audio; and
applying the second gain table to the output audio.

5. The method of claim 1, wherein the second noise removal module is an artificial-intelligence-based noise detector built by performing operations comprising:
replaying a plurality of audio clips at various distances from a microphone;
recording the replayed audio clips;
labeling the recorded audio clips with a first label indicating the audio clip contains speech, noise, or background speech; and
using the labeled recorded audio clips, training the artificial-intelligence-based noise detector to identify participant speech, noise or background speech in an audio signal not having a label.

6. The method of claim 1, wherein the second noise removal module is an artificial-intelligence-based noise detector built by performing operations comprising:
replaying a plurality of audio clips at various distances from a microphone;
recording the replayed audio clips;
adjusting energy levels of the recorded audio clips;
labeling the recorded audio clips and the adjusted audio clips with a first label indicating the clip contains participant speech, noise, or background speech; and
using the labeled audio clips, training the artificial-intelligence-based noise detector to identify participant speech, noise or background speech in an audio signal not having a label.

7. A non-transitory computer storage that stores executable program instructions that, when executed by one or more computing devices, configure the one or more computing devices to perform operations comprising:
receiving an input audio from an audio capturing device, the input audio comprising speech from a participant of an online conference;
determining a type of audio playback device of the online conference; and
routing the received input audio to a first or second noise removal module, based on the determined type of the audio playback device, wherein the first noise removal module includes a first artificial intelligence model configured to remove noise and the second noise removal module includes a second artificial intelligence model configured to remove noise and background speech.

8. The non-transitory computer storage of claim 7, wherein when the audio playback device is of a type playing the online conference audio in an ear of the participant of the online conference, the input audio is routed to the second noise removal module, and
wherein when the audio playback device is of a type not playing the online conference audio in the ear of the participant, the input audio is routed to the first noise removal module.

9. The non-transitory computer storage of claim 7,
wherein the first noise removal module comprises a first artificial intelligence-based noise detector, trained to label noise portions of the input audio and wherein removing noise by the first noise removal module comprises applying a first mask to the input audio, suppressing portions of the input audio labeled by the first noise removal module, and
wherein the second noise removal module comprises a second artificial intelligence-based noise detector, trained to label noise and background speech portions of the input audio and wherein removing noise and background speech by the second noise removal module comprises applying a second mask to the input audio, suppressing portions of the input audio labeled by the second noise removal module.

10. The non-transitory computer storage of claim 7, wherein removing noise and background speech by the second noise removal module comprises:
labeling portions of the input audio comprising noise and background speech; and
applying a first gain table to the input audio, based on the labeling, wherein the first gain table suppresses the noise and background speech portions of the input audio, wherein the operations further comprise:
generating an output audio by the second noise removal module;
generating a second gain table, wherein the second gain table values are adjusted gain values based on the first gain table values, wherein the adjustment comprises lowering gain values in the second gain table relative to the gain values in the first gain table for the noise and background speech portions of the output audio; and
applying the second gain table to the output audio.

11. The non-transitory computer storage of claim 7, wherein the second noise removal module is an artificial-intelligence-based noise detector built by performing operations comprising:
replaying a plurality of audio clips at various distances from a microphone;
recording the replayed audio clips;
labeling the recorded audio clips with a first label indicating the audio clip contains speech, noise, or background speech; and
using the labeled recorded audio clips, training the artificial-intelligence-based noise detector to identify participant speech, noise or background speech in an audio signal not having a label.

12. The non-transitory computer storage of claim 7, wherein the second noise removal module is an artificial-intelligence-based noise detector built by performing operations comprising:
replaying a plurality of audio clips at various distances from a microphone;
recording the replayed audio clips;
adjusting energy levels of the recorded audio clips;
labeling the recorded audio clips and the adjusted audio clips with a first label indicating the clip contains participant speech, noise, or background speech; and
using the labeled audio clips, training the artificial-intelligence-based noise detector to identify participant speech, noise or background speech in an audio signal not having a label.

13. A system comprising:
one or more processors; and
one or more memories containing instructions executable by the one or more processors to perform operations, including instructions to:
receive an input audio from an audio capturing device, the input audio comprising speech from a participant of an online conference;
determine, by an audio playback detector, a type of audio playback device of the online conference; and
route the received input audio to a first or second artificial-intelligence-based noise detector, based on the determined type of the audio playback device, wherein the first artificial-intelligence-based noise detector is trained to detect and remove noise and the second artificial-intelligence-based noise detector is trained to detect and remove noise and background speech.

14. The system of claim 13,
wherein when the audio playback device is of a type playing the online conference audio in an ear of the participant of the online conference, the input audio is routed to the second artificial-intelligence-based noise detector, and
wherein when the audio playback device is of a type not playing the online conference audio in the ear of the participant, the input audio is routed to the first artificial-intelligence-based noise detector.

15. The system of claim 13,
wherein the first artificial-intelligence-based noise detector is further trained to label noise portions of the input audio and wherein removing noise by the first artificial-intelligence-based noise detector comprises applying a first mask to the input audio, suppressing portions of the input audio labeled by the first artificial-intelligence-based noise detector, and
wherein the second artificial-intelligence-based noise detector is further trained to label noise and background speech portions of the input audio and wherein removing noise and background speech by the second artificial-intelligence-based noise detector comprises applying a second mask to the input audio, suppressing portions of the input audio labeled by the second artificial-intelligence-based noise detector.

16. The system of claim 13, wherein removing noise and background speech by the second artificial-intelligence-based noise detector comprises:
labeling portions of the input audio comprising noise and background speech; and applying a first gain table to the input audio, based on the labeling, wherein the first gain table suppresses the noise and background speech portions of the input audio, wherein the operations further comprise:
generating an output audio by the second artificial-intelligence-based noise detector;
generating a second gain table, wherein the second gain table values are adjusted gain values based on the first gain table values, wherein the adjustment comprises lowering gain values in the second gain table relative to the gain values in the first gain table for the noise and background speech portions of the output audio; and applying the second gain table to the output audio.

17. The system of claim 13, wherein the second artificial-intelligence-based noise detector is trained using training data generated by performing operations comprising:
replaying a plurality of audio clips at various distances from a microphone;
recording the replayed audio clips;
labeling the recorded audio clips with a first label indicating the audio clip contains speech, noise, or background speech; and
using the labeled recorded audio clips, training the second artificial-intelligence-based noise detector to identify participant speech, noise or background speech in an audio signal not having a label.

18. The system of claim 15, wherein the second artificial-intelligence-based noise detector is further trained to perform at least one of:
converting the input audio from the time domain to the frequency domain;
segmenting the input audio into one or more portions; or
estimating a speech level within the input audio.

* * * * *